United States Patent
Baik

(10) Patent No.: US 9,531,927 B2
(45) Date of Patent: Dec. 27, 2016

(54) OPTICAL SYSTEM

(71) Applicant: Samsung Electro-Mechanics Co., Ltd., Suwon-si (KR)

(72) Inventor: Jae Hyun Baik, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/644,431

(22) Filed: Mar. 11, 2015

(65) Prior Publication Data

US 2016/0091693 A1    Mar. 31, 2016

(30) Foreign Application Priority Data

Sep. 30, 2014 (KR) .................. 10-2014-0130795

(51) Int. Cl.
| | |
|---|---|
| *G02B 13/18* | (2006.01) |
| *G02B 15/14* | (2006.01) |
| *H04N 5/225* | (2006.01) |
| *G02B 13/00* | (2006.01) |

(52) U.S. Cl.
CPC .......... *H04N 5/2254* (2013.01); *G02B 13/004* (2013.01); *H04N 5/2253* (2013.01)

(58) Field of Classification Search
USPC .................................. 359/694–715, 811–830
See application file for complete search history.

(56) References Cited

U.S. PATENT DOCUMENTS

| | | | | |
|---|---|---|---|---|
| 8,717,688 B2* | 5/2014 | Chou | ................ | G02B 13/0045 359/714 |
| 8,941,933 B2* | 1/2015 | Hsu | ......................... | G02B 9/34 359/715 |
| 2007/0188890 A1 | 8/2007 | Jo et al. | | |
| 2007/0188891 A1 | 8/2007 | Shinohara | | |
| 2013/0265652 A1 | 10/2013 | An et al. | | |
| 2013/0342919 A1 | 12/2013 | Tang et al. | | |
| 2014/0078602 A1 | 3/2014 | Chae | | |
| 2014/0254031 A1* | 9/2014 | Liao | ................ | G02B 13/004 359/715 |

FOREIGN PATENT DOCUMENTS

| | | |
|---|---|---|
| CN | 101135768 A | 3/2008 |
| JP | 2007-219079 A | 8/2007 |
| KR | 10-0691624 B1 | 3/2007 |
| KR | 10-2013-0113796 A | 10/2013 |
| KR | 10-2014-0036811 A | 3/2014 |

OTHER PUBLICATIONS

Korean Office Action issued Apr. 1, 2016, in counterpart Korean Application No. KR 10-2014-0130795 (24 pages, in Korean, with English language translation).

* cited by examiner

*Primary Examiner* — Mohammed Hasan

(74) *Attorney, Agent, or Firm* — NSIP Law

(57) ABSTRACT

An optical system includes a first lens having positive refractive power, of which both surfaces are convex, a second lens having negative refractive power, a third lens having positive refractive power, and a fourth lens having negative refractive power. The first to fourth lenses are sequentially disposed from an object side. Whereby, an aberration improvement effect may be increased, high resolution may be implemented, sensitivity of lenses may be improved, and a demand for miniaturization may be satisfied.

26 Claims, 25 Drawing Sheets

| Surface | Radius | Thickness | Index | ABBE NUMBER |
|---|---|---|---|---|
| Object | Infinity | Infinity | | |
| 1 | Infinity | 0.051 | | |
| 2 | 0.8712 | 0.352 | 1.547 | 56.1 |
| 3 | -8.5137 | 0.051 | | |
| 4 | -68.1307 | 0.225 | 1.646 | 23.3 |
| 5 | 1.5616 | 0.146 | | |
| 6 | -3.4425 | 0.495 | 1.547 | 56.1 |
| 7 | -0.4247 | 0.062 | | |
| 8 | -25.9547 | 0.244 | 1.547 | 56.1 |
| 9 | 0.4700 | 0.175 | | |
| 10 | Infinity | 0.110 | 1.516 | 55.15 |
| 11 | Infinity | 0.383 | | |
| Image | Infinity | 0.010 | | |

FIG. 4

| Example 1 | 2 | 3 | 4 | 5 | 6 | 7 | 8 | 9 |
|---|---|---|---|---|---|---|---|---|
| Y RADIUS | 0.871169229 | -8.513713117 | -88.18740032 | 1.561621040 | -3.442495271 | -0.42471524 | -25.35468821 | |
| CONIC CONSTANT | -2.541136843 | 0 | -50.00000199 | 8.088857333 | 43.2713085 | -4.817920805 | 0 | -6.706564009 |
| 4-TH ORDER COEFFICIENT (A) | 0.11568526 | -0.254798342 | -3.481192036 | -0.078862452 | 0.563261478 | -1.666941084 | -0.495551445 | -0.600615743 |
| 6-TH ORDER COEFFICIENT (B) | 12.87877774 | -7.01056391 | -5.966145667 | -2.810449574 | 0.005207263 | 11.57472539 | -0.784606954 | 0.99909.637 |
| 8-TH ORDER COEFFICIENT (C) | -293.8282794 | 9.366531731 | 14.79626382 | 7.843522306 | 22.12771089 | -49.17320799 | -3.178965982 | 0.74720127 |
| 10-TH ORDER COEFFICIENT (D) | 3246.330613 | 1928.308497 | 1262.236923 | -8.582776302 | -599.0372934 | 72.25180816 | 13.39012611 | -3.17361629 |
| 12-TH ORDER COEFFICIENT (E) | -24210.77289 | -30466.39497 | -17538.17237 | 4.618732296 | 5378.558724 | 278.76866 | -14.847496 | 5.10324091 |
| 14-TH ORDER COEFFICIENT (F) | 87639.31347 | 196805.938 | 106648.0891 | -1.220108202 | -21417.66032 | -1136.915362 | -21.64922704 | -3.96530177 |
| 16-TH ORDER COEFFICIENT (G) | -131358.0913 | -461695.7753 | -237266.9442 | 0.126681652 | 31862.18778 | 1093.81871 | 29.08281922 | 1.182026674 |
| 18-TH ORDER COEFFICIENT (H) | | | | | | | | |
| 20-TH ORDER COEFFICIENT (J) | | | | | | | | |

FIG. 5

| Surface | Radius | Thickness | Index | ABBE NUMBER |
|---|---|---|---|---|
| Object | Infinity | Infinity | | |
| 1 | Infinity | 0.05 | | |
| 2 | 0.8550 | 0.350 | 1.547 | 56.1 |
| 3 | -3.8329 | 0.060 | | |
| 4 | -39.0197 | 0.225 | 1.646 | 23.3 |
| 5 | 1.8058 | 0.165 | | |
| 6 | -2.2882 | 0.350 | 1.547 | 56.1 |
| 7 | -0.4479 | 0.050 | | |
| 8 | -9.9784 | 0.225 | 1.547 | 56.1 |
| 9 | 0.4834 | 0.131 | | |
| 10 | Infinity | 0.110 | 1.516 | 55.15 |
| 11 | Infinity | 0.403 | | |
| Image | Infinity | -0.010 | | |

FIG. 9

| Example 2 | 2 | 3 | 4 | 5 | 6 | 7 | 8 | 9 |
|---|---|---|---|---|---|---|---|---|
| Y RADIUS | 0.855 | -3.892918821 | -33.01973148 | 1.85770904 | -2.23924168 | -0.44787348 | -3.978975874 | 0.48333916 |
| CONIC CONSTANT | -4.783458147 | 0 | -50.00000001 | 10.30747098 | 24.34103204 | -4.548106452 | 0 | -7.85681163 |
| 4-TH ORDER COEFFICIENT (A) | 0.506244832 | -1.540981034 | -1.081722773 | -0.074611327 | 1.236845101 | -1.156158857 | -2.865255474 | -1.7841303 |
| 6-TH ORDER COEFFICIENT (B) | 3.649083 | 4.530458884 | -4.904896018 | -3.288732636 | -8.971883948 | 15.31669455 | 19.63204766 | 7.60321716 |
| 8-TH ORDER COEFFICIENT (C) | -165.3216874 | -198.097430I | 65.56722862 | 19.07388734 | 121.6363143 | -86.054135T9 | -95.71025504 | -25.10361929 |
| 10-TH ORDER COEFFICIENT (D) | 2634.118881 | 3720.697322 | 411.6108506 | -33.7441.6172 | -1075.104605 | 984.143811.6 | 295.8040843 | 52.18880752 |
| 12-TH ORDER COEFFICIENT (E) | -20892.85337 | -33050.10005 | -7022.161408 | 27.49247213 | 4259.865053 | -1112.883491 | -519.7288218 | -85.73865669 |
| 14-TH ORDER COEFFICIENT (F) | 83269.08377 | 144573.475 | 35145.22416 | -10.64220821 | -7761.69132 | 1697.500569 | 473.4562146 | 45.27670319 |
| 16-TH ORDER COEFFICIENT (G) | -129989.3103 | -249597.2454 | -97160.53645 | 1.59319I862 | 706.342399 | -1040.765453 | -175.7495833 | -12.96817673 |
| 18-TH ORDER COEFFICIENT (H) |  |  |  |  |  |  |  |  |
| 20-TH ORDER COEFFICIENT (I) |  |  |  |  |  |  |  |  |

FIG. 10

| Surface | Radius | Thickness | Index | ABBE NUMBER |
|---|---|---|---|---|
| Object | Infinity | Infinity | | |
| 1 | Infinity | 0.051 | | |
| 2 | 0.855 | 0.335 | 1.547 | 56.1 |
| 3 | -6.64238 | 0.051 | | |
| 4 | -1806.16248 | 0.225 | 1.646 | 23.3 |
| 5 | 1.43721 | 0.183 | | |
| 6 | -3.33097 | 0.495 | 1.547 | 56.1 |
| 7 | -0.4234 | 0.050 | | |
| 8 | -72.84257 | 0.244 | 1.547 | 56.1 |
| 9 | 0.47 | 0.164 | | |
| 10 | Infinity | 0.110 | 1.516 | 55.15 |
| 11 | Infinity | 0.383 | | |
| Image | Infinity | 0.010 | | |

FIG. 14

| Example 3 | 2 | 3 | 4 | 5 | 6 | 7 | 8 | 9 |
|---|---|---|---|---|---|---|---|---|
| Y RADIUS | 0.855 | -6.642263266 | -106.162477 | 1.43720929 | -3.320972909 | -0.423042308 | -72.54256699 | 0.47 |
| CONIC CONSTANT | -2.433803144 | 0 | -50.00000000 | 6.370531042 | 37.87821186 | -4.978343149 | 0 | -5.675175111 |
| 4-TH ORDER COEFFICIENT (A) | 0.215261688 | 0.803018013 | 0.699897245 | 0.569827401 | 0.636072103 | -2.499060158 | -1.263224465 | -1.271909142 |
| 6-TH ORDER COEFFICIENT (B) | 10.70830459 | -8.115846915 | -7.859851168 | -3.867264746 | -2.275417488 | 15.33425217 | -3.239647925 | 3.421434342 |
| 8-TH ORDER COEFFICIENT (C) | -246.862175 | 16.67341692 | -39.23028291 | 7.29489505 | 9.001171933 | -97.10273611 | 29.40244985 | -7.580742965 |
| 10-TH ORDER COEFFICIENT (D) | 3158.51444 | 405.1463513 | 1131.813712 | -6.39973072 | -4.896712448 | 455.1153613 | -78.15403621 | 12.38123592 |
| 12-TH ORDER COEFFICIENT (E) | -22720.97153 | -6708.205252 | -11405.13628 | 2.840951682 | 583.3760761 | -1324.719828 | 106.048514 | -13.38000569 |
| 14-TH ORDER COEFFICIENT (F) | 95868.88773 | 37089.874 | 54536.07627 | -0.643445716 | -3472.74134 | 2304.800632 | -79.83762086 | 8.255351668 |
| 16-TH ORDER COEFFICIENT (G) | -126040.4342 | -68223.71912 | -27788.77407 | 0.067813948 | 3912.814274 | -1891.365383 | 24.465136 | -2.178523873 |
| 18-TH ORDER COEFFICIENT (H) | | | | | | | | |
| 20-TH ORDER COEFFICIENT (J) | | | | | | | | |

FIG. 15

| Surface | Radius | Thickness | Index | ABBE NUMBER |
|---|---|---|---|---|
| Object | Infinity | Infinity | | |
| 1 | Infinity | 0.051 | | |
| 2 | 0.8555 | 0.348 | 1.547 | 56.1 |
| 3 | -8.5293 | 0.051 | | |
| 4 | -301.55684 | 0.225 | 1.646 | 23.3 |
| 5 | 1.53011 | 0.111 | | |
| 6 | -3.63761 | 0.452 | 1.547 | 56.1 |
| 7 | -0.42 | 0.052 | | |
| 8 | -102.95727 | 0.244 | 1.547 | 56.1 |
| 9 | 0.47 | 0.150 | | |
| 10 | Infinity | 0.110 | 1.516 | 55.15 |
| 11 | Infinity | 0.390 | | |
| Image | Infinity | 0.010 | | |

FIG. 19

| Example 4 | 2 | 3 | 4 | 5 | 6 | 7 | 8 | 9 |
|---|---|---|---|---|---|---|---|---|
| Y RADIUS | 0.85408746 | -8.529297192 | -301.583413 | 1.50019461 | -3.637617726 | -0.42 | -102.9872704 | 0.47 |
| CONIC CONSTANT | -1.825608653 | 0 | -50.00000104 | 7.887633616 | 43.27130842 | -5.10231285 | 0 | -6.766579194 |
| 4-TH ORDER COEFFICIENT (A) | 0.084164782 | -0.235707763 | -0.342083392 | 0.226461265 | 1.154670984 | -2.170073602 | -1.242380602 | -0.98231715 |
| 6-TH ORDER COEFFICIENT (B) | 11.480078 | -7.418174991 | -3.974025203 | -5.630091962 | -3.801770845 | 12.57631614 | -2.252928268 | 1.28495541 |
| 8-TH ORDER COEFFICIENT (C) | -235.7353827 | -58.93145628 | -163.5398605 | 22.17670565 | 19.36081673 | -44.28653455 | 15.53763224 | -0.52843385 |
| 10-TH ORDER COEFFICIENT (D) | 2665.187593 | 3635.185367 | 4623.4777 | -34.80200429 | -103.4161021 | 13.9326861 | -22.10277782 | -1.74278458 |
| 12-TH ORDER COEFFICIENT (E) | -30023.92443 | -49575.7935 | -48868.83696 | 25.80211779 | 915.9722294 | 710.221496 | 16.46572125 | 3.27930905 |
| 14-TH ORDER COEFFICIENT (F) | 119073.6843 | 308720.6569 | 244223.2555 | -3.461145729 | -4106.091706 | -2261.006369 | -16.95380114 | -2.33287771 |
| 16-TH ORDER COEFFICIENT (G) | -186353.2611 | -721329.226 | -505700.9334 | 0 | 6465.497948 | 2053.336484 | 13.62662808 | 0.58810066 |
| 18-TH ORDER COEFFICIENT (H) |  |  |  |  |  |  |  |  |
| 20-TH ORDER COEFFICIENT (J) |  |  |  |  |  |  |  |  |

FIG. 20

| Surface | Radius | Thickness | Index | ABBE NUMBER |
|---|---|---|---|---|
| Object | Infinity | Infinity | | |
| 1 | Infinity | 0.500 | | |
| 2 | 1.14729 | 0.335 | 1.547 | 56.1 |
| 3 | -3.05271 | 0.078 | | |
| 4 | -27.54144 | 0.225 | 1.646 | 23.3 |
| 5 | 1.68705 | 0.076 | | |
| 6 | -2.27097 | 0.417 | 1.547 | 56.1 |
| 7 | -0.42 | 0.051 | | |
| 8 | 3.3672 | 0.303 | 1.547 | 56.1 |
| 9 | 0.47 | 0.164 | | |
| 10 | Infinity | 0.110 | 1.516 | 55.15 |
| 11 | Infinity | 0.383 | | |
| Image | Infinity | 0.010 | | |

FIG. 24

| Example 5 | 2 | 3 | 4 | 5 | 6 | 7 | 8 | 9 |
|---|---|---|---|---|---|---|---|---|
| Y RADIUS | 1.147291680 | -3.062714308 | -27.54146814 | 1.68704735 | -2.27046884 | -0.42 | 3.367202567 | 0.47 |
| CONIC CONSTANT | -3.942644756 | 0 | -49.93306868 | -1.12735704 | 17.09921755 | -5.173752663 | 0 | -6.645485414 |
| 4-TH ORDER COEFFICIENT (A) | 0.005735997 | -1.893515543 | -2.903319708 | -0.808488924 | 1.055626976 | -4.404603329 | -2.851464525 | -0.516823 |
| 6-TH ORDER COEFFICIENT (B) | 1.51769784 | -15.5175026 | -14.3872582 | -3.639228018 | 10.8604481 | 37.4892621 | 24.85782829 | -0.167898763 |
| 8-TH ORDER COEFFICIENT (C) | -169.8662274 | 580.7382036 | 325.0718826 | 7.045482093 | -196.4135366 | -153.6942202 | -189.2134454 | 0.23773093 |
| 10-TH ORDER COEFFICIENT (D) | 3394.634082 | -11907.49499 | -4519.710552 | -5.6159225 | 140.354851 | -121.4301174 | 766.5654565 | 2.171897822 |
| 12-TH ORDER COEFFICIENT (E) | -33875.31325 | 115026.8592 | 35336.53398 | 2.292818638 | -4392.06196 | 3823.819275 | -1328.558656 | -3.814735912 |
| 14-TH ORDER COEFFICIENT (F) | 180831.6048 | -602208.5935 | -149367.6016 | -0.470854406 | 7812.579653 | -10916.06951 | 1726.907159 | 4.720538229 |
| 16-TH ORDER COEFFICIENT (G) | -334001.1489 | 1282259.277 | 258780.0488 | 0.038631229 | -3741.44073 | 1064.41734 | -720.0662658 | -1.623673052 |
| 18-TH ORDER COEFFICIENT (H) | | | | | | | | |
| 20-TH ORDER COEFFICIENT (J) | | | | | | | | |

FIG. 25

OPTICAL SYSTEM

CROSS-REFERENCE TO RELATED APPLICATION

This application claims the priority and benefit of Korean Patent Application No. 10-2014-0130795 filed on Sep. 30, 2014, with the Korean Intellectual Property Office, the disclosure of which is incorporated herein by reference.

BACKGROUND

The present disclosure relates to an optical system.

Mobile communications terminals have commonly been provided with camera modules, allowing users to make video calls, as well as to capture still and moving images. In addition, as the degree of functionality of camera modules included in mobile communications terminals has gradually increased, camera modules for mobile communications terminals have come to be required to have high levels of resolution and high degrees of performance.

However, since mobile communications terminals have been miniaturized and lightened, there are limitations in implementing camera modules having the high levels of resolution and high degrees of performance.

In order to solve these problems, lenses included in such camera modules have been formed of a plastic material, a material lighter than glass, and lens modules have been configured with five or more lenses, in order to implement high levels of resolution in images captured thereby.

SUMMARY

An aspect of the present disclosure may provide an optical system capable of increasing an aberration improvement effect, implementing high resolution, improving sensitivity of lenses, and satisfying demand for miniaturization.

According to an aspect of the present disclosure, an optical system may include: a first lens having positive refractive power, of which both surfaces are convex, a second lens having negative refractive power, a third lens having positive refractive power, and a fourth lens having negative refractive power, wherein the first to fourth lenses are sequentially disposed from an object side, whereby an aberration improvement effect may be increased, high resolution may be implemented, sensitivity of lenses may be improved, and demand for miniaturization may be satisfied.

BRIEF DESCRIPTION OF DRAWINGS

The above and other aspects, features and other advantages of the present disclosure will be more clearly understood from the following detailed description taken in conjunction with the accompanying drawings, in which:

FIG. 4 is a table showing characteristics of each lens of the optical system shown in FIG. 1;

FIG. 5 is a table showing aspherical surface coefficients of each lens of the optical system shown in FIG. 1;

FIG. 9 is a table showing characteristics of each lens of the optical system shown in FIG. 6;

FIG. 10 is a table showing aspherical surface coefficients of each lens of the optical system shown in FIG. 6;

FIG. 14 is a table showing characteristics of each lens of the optical system shown in FIG. 11;

FIG. 15 is a table showing aspherical surface coefficients of each lens of the optical system shown in FIG. 11;

FIG. 19 is a table showing characteristics of each lens of the optical system shown in FIG. 16;

FIG. 20 is a table showing aspherical surface coefficients of each lens of the optical system shown in FIG. 16;

FIG. 24 is a table showing characteristics of each lens of the optical system shown in FIG. 21; and FIG. 25 is a table showing aspherical surface coefficients of each lens of the optical system shown in FIG. 21.

DETAILED DESCRIPTION

Figure 1:
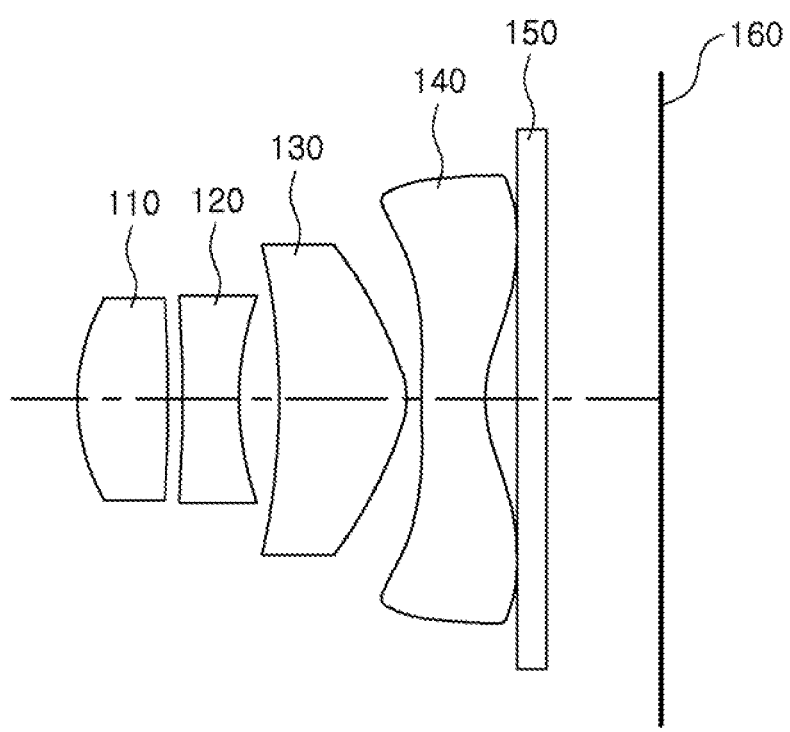
FIG. 1 is a configuration diagram of an optical system according to a first exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the following lens configuration diagrams, thicknesses, sizes, and shapes of lenses have been slightly exaggerated for explanation. Particularly, a shape of a spherical surface or an aspherical surface shown in the lens configuration diagrams has been shown only by way of example. That is, the spherical surface or the aspherical surface is not limited to having the shown shape.

In addition, it is to be noted that a first lens refers to a lens that is the closest to an object side, and a fourth lens refers to a lens that is the closest to an image side.

Further, it is to be noted that the term 'front' refers to a direction from the optical system toward the object side, while the term 'rear' refers to a direction from the optical system toward an image sensor or the image side. Further, it is to be noted that a first surface of each lens refers to a surface close to the object side (or an object-side surface) and a second surface of each lens refers to a surface close to the image side (or an image-side surface). Further, in the present specification, it is to be noted that units of all of numerical values of radii of curvature, thicknesses, and the like, of lenses are taken in millimeters (mm).

An optical system according to an exemplary embodiment of the present disclosure may include four lenses.

That is, the optical system according to an exemplary embodiment of the present disclosure may include a first lens, a second lens, a third lens, and a fourth lens.

However, the optical system according to an exemplary embodiment of the present disclosure is not limited to including only the four lenses, but may further include other components, if necessary. For example, the optical system may include an aperture stop controlling an amount of light. In addition, the optical system may further include an optical filter cutting off an infrared ray. Further, the optical system may further include an image sensor converting an image of a subject incident thereto into an electrical signal. Further, the optical system may further include a gap maintaining member adjusting a gap between lenses.

The first to fourth lenses configuring the optical system according to an exemplary embodiment of the present disclosure may be formed of a plastic material, the optical filter may be formed of a plastic material, and an Abbe number of the optical filter may be less than 60.

In addition, at least one of the first to fourth lenses may have an aspherical surface. Further, each of the first to fourth lenses may have at least one aspherical surface.

Here, the aspherical surfaces of the first to fourth lenses may be represented by Mathematical Expression 1.

$$Z = \frac{cY^2}{1+\sqrt{1-(1+K)c^2Y^2}} + AY^4 + BY^6 + CY^8 DY^{10} + EY^{12} + FY^{14} + $$

[Mathematical Expression 1]

Here, c is a curvature (inverse number of a radius of curvature) at an apex of the lens, K is a Conic constant, and Y is a distance in a direction perpendicular to an optical axis. In addition, constants A to F mean aspherical surface coefficients. In addition, Z indicates a distance from the apex of the lens in an optical axis direction.

The optical system including the first to fourth lenses may have positive refractive power/negative refractive power/positive refractive power/negative refractive power sequentially from the object side.

The optical system configured as described above may improve an aberration improvement effect, implement high resolution, improve sensitivity of lenses, and satisfy a demand for miniaturization.

The optical system according to an exemplary embodiment of the present disclosure may satisfy Conditional Expression 1.

$BFL/f<0.4$ [Conditional Expression 1]

Here, BFL is a distance from an image-side surface of the fourth lens to an imaging surface of the image sensor, and f is an overall focal length of the optical system.

When BFL/4 is out of an upper limit of Conditional Expression 1, it may be difficult to implement performance of the miniaturized optical system.

The optical system according to an exemplary embodiment of the present disclosure may satisfy Conditional Expression 2.

$TTL/D2>9.3$ [Conditional Expression 2]

Here, TTL is a distance from an object-side surface of the first lens to the imaging surface of the image sensor, and D2 is a thickness of the second lens in a paraxial region.

When TTL/D2 is out of a lower limit of Conditional Expression, it may be difficult to miniaturize the optical system.

The optical system according to an exemplary embodiment of the present disclosure may satisfy Conditional Expression 3.

$1.1<f12/f<2.1$ [Conditional Expression 3]

Here, f12 is a synthetic focal length of the first and second lenses, and f is the overall focal length of the optical system.

When f12/f is out of a lower limit of Conditional Expression 3, refractive power may become excessively large, such that it may be difficult to correct spherical aberration, and when f12/f exceeds an upper limit of Conditional Expression 3, it may be difficult to miniaturize the optical system.

The optical system according to an exemplary embodiment of the present disclosure may satisfy Conditional Expression 4.

$R1/f>0.5$ [Conditional Expression 4]

Here, R1 is a radius of curvature of the object-side surface of the first lens, and f is the overall focal length of the optical system.

When R1/f is out of a lower limit of Conditional Expression 4, a radius of curvature of the object-side surface of the first lens may become excessively small, such that the first lens becomes sensitive to an assembling tolerance of the optical system.

The optical system according to an exemplary embodiment of the present disclosure may satisfy Conditional Expression 5.

$V1-V2>30$ [Conditional Expression 5]

Here, V1 is an Abbe number of the first lens, and V2 is an Abbe number of the second lens.

When V1−V2 is out of a lower limit of Conditional Expression 5, it may be difficult to correct aberration.

The optical system according to an exemplary embodiment of the present disclosure may satisfy Conditional Expression 6.

$0.65<(R6-R7)/(R6+R7)<0.85$ [Conditional Expression 6]

Here, R6 is a radius of curvature of an object-side surface of the third lens, and R7 is a radius of curvature of an image-side surface of the third lens.

When (R6−R7)/(R6+R7) is out of an upper limit and a lower limit of Conditional Expression 6, it may be difficult to correct aberration.

The optical system according to an exemplary embodiment of the present disclosure may satisfy Conditional Expression 7.

$f/ImgH<1.4$ [Conditional Expression 7]

Here, f is the overall focal length of the optical system, and ImgH is a diagonal length of the imaging surface of the image sensor.

When f/ImgH is out of an upper limit of Conditional Expression, it may be difficult to correct aberration and it may be difficult to miniaturize the optical system.

Next, the first to fourth lenses configuring the optical system according to an exemplary embodiment of the present disclosure will be described.

The first lens may have positive refractive power. In addition, both surfaces of the first lens may be convex.

At least one of the first and second surfaces of the first lens may be aspherical. For example, both surfaces of the first lens may be aspherical.

The second lens may have negative refractive power. In addition, both surfaces of the second lens may be concave.

At least one of the first and second surfaces of the second lens may be aspherical. For example, both surfaces of the second lens may be aspherical.

Meanwhile, the first and second lenses may entirely have positive refractive power.

The third lens may have positive refractive power. In addition, the third lens may have a meniscus shape in which it is convex toward an image. In detail, first and second surfaces of the third lens may be convex toward the image.

At least one of the first and second surfaces of the third lens may be aspherical. For example, both surfaces of the third lens may be aspherical.

The fourth lens may have negative refractive power. In addition, both surfaces of the fourth lens may be concave.

Unlike this, the fourth lens may have a meniscus shape in which it is convex toward an object. In detail, first and second surfaces of the fourth lens may be convex toward the object.

At least one of the first and second surfaces of the fourth lens may be aspherical. For example, both surfaces of the fourth lens may be aspherical.

In addition, the fourth lens may have at least one inflection point formed on a first surface thereof, and have at least one inflection point formed on a second surface thereof. For example, the second surface of the fourth lens may be concave in the paraxial region and become convex toward an edge thereof.

In the optical system configured as described above, a plurality of lenses perform an aberration correction function, whereby the optical system that may improve aberration improvement performance, implement high resolution, and be slim may be implemented.

In addition, the sensitivity of the assembling tolerance of the optical system may be improved.

In addition, in the optical system, all of the lenses are formed of a plastic material, whereby a cost required for manufacturing a lens module may be decreased and manufacturing efficiency of the lens module may be increased.

An optical system according to a first exemplary embodiment of the present disclosure will be described with reference to FIGS. 1 through 5.

The optical system according to a first exemplary embodiment of the present disclosure may include a first lens 110, a second lens 120, a third lens 130, and a fourth lens 140, and may further include an optical filter 150 and an image sensor 160.

Here, as shown in Table 1, a distance (OAL) from an object-side surface of the first lens 110 to a first surface (imaging surface) of the image sensor 160 may be 2.30008 mm, and a distance (BFL) from an image-side surface of the fourth lens 140 to an imaging surface may be 0.67493 mm.

In addition, a focal length (f1) of the first lens 110 may be 1.46559 mm, a focal length (f2) of the second lens 120 may be −2.35985 mm, a focal length (f3) of the third lens 130 may be 0.83796 mm, a focal length (f4) of the fourth lens 140 may be −0.84198 mm, and an overall focal length (f) of the optical system may be 1.705 mm.

TABLE 1

| | |
|---|---|
| f | 1.705 |
| f1 | 1.46559 |
| f2 | −2.35985 |
| f3 | 0.83796 |
| f4 | −0.84198 |
| v1 | 56.11378 |
| v2 | 23.27531 |
| v3 | 56.11378 |
| v4 | 56.11378 |
| OAL | 2.30008 |
| BFL | 0.67493 |

Here, lens characteristics (radii of curvature, thicknesses of lenses or distances between the lenses, refractive indices, and Abbe numbers) of each lens are shown in FIG. 4.

In a first exemplary embodiment of the present disclosure, the first lens 110 may have positive refractive power and have both surfaces that are convex. The second lens 120 may have negative refractive power and have both surfaces that are concave. The third lens 130 may have positive refractive power and have a meniscus shape in which it is convex toward the image. The fourth lens 140 may have negative refractive power and have both surfaces that are concave. In addition, the fourth lens 140 may have at least one inflection point formed on each of first and second surfaces thereof.

Meanwhile, the respective surfaces of the first to fourth lenses 110 to 140 may have aspherical surface coefficients as shown in FIG. 5. That is, the first to fourth lenses 110 to 140 may have aspherical surfaces, respectively.

Figure 2:
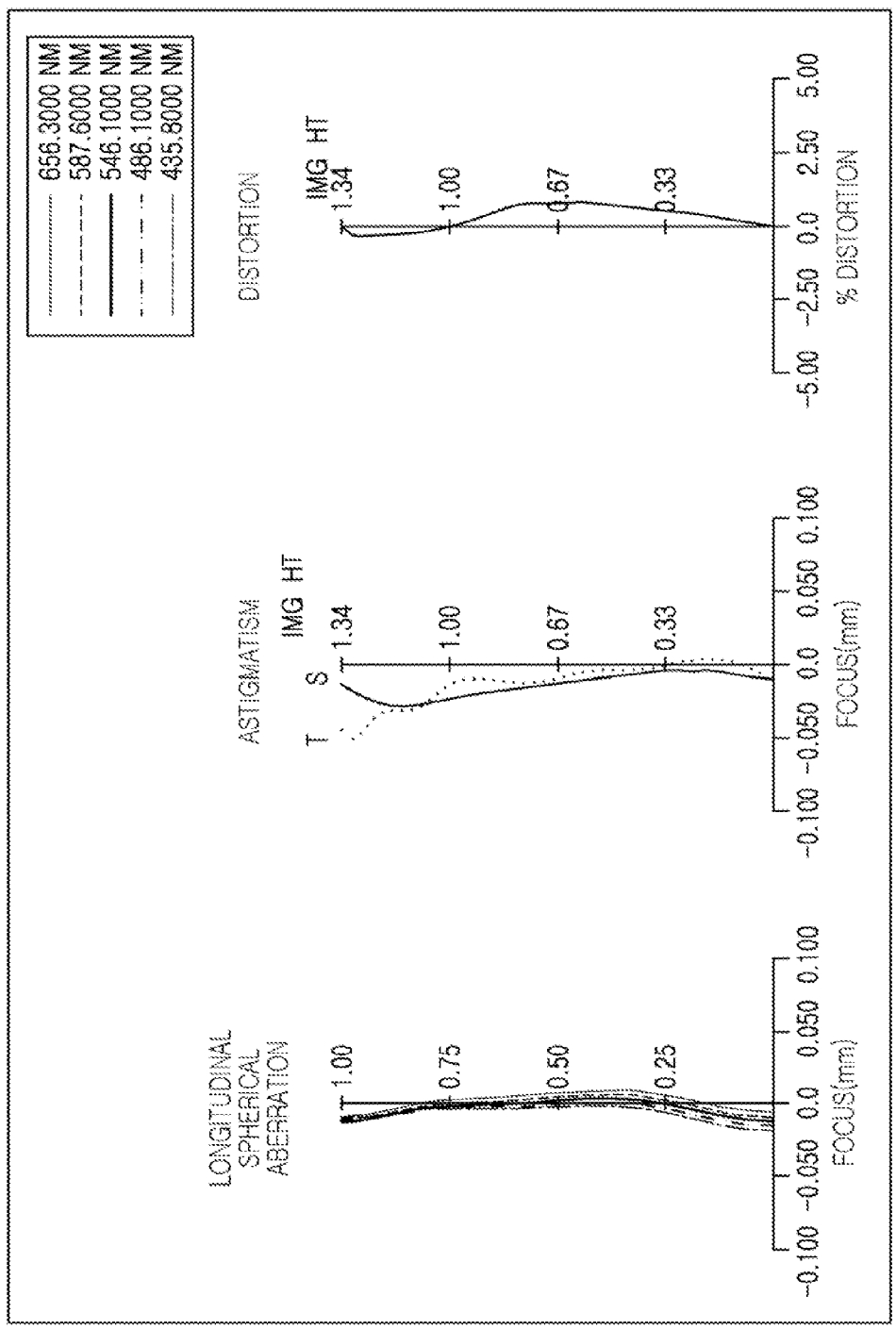
FIGS. 2 and 3 are curves showing aberration characteristics of the optical system shown in FIG. 1.
Figure 3:
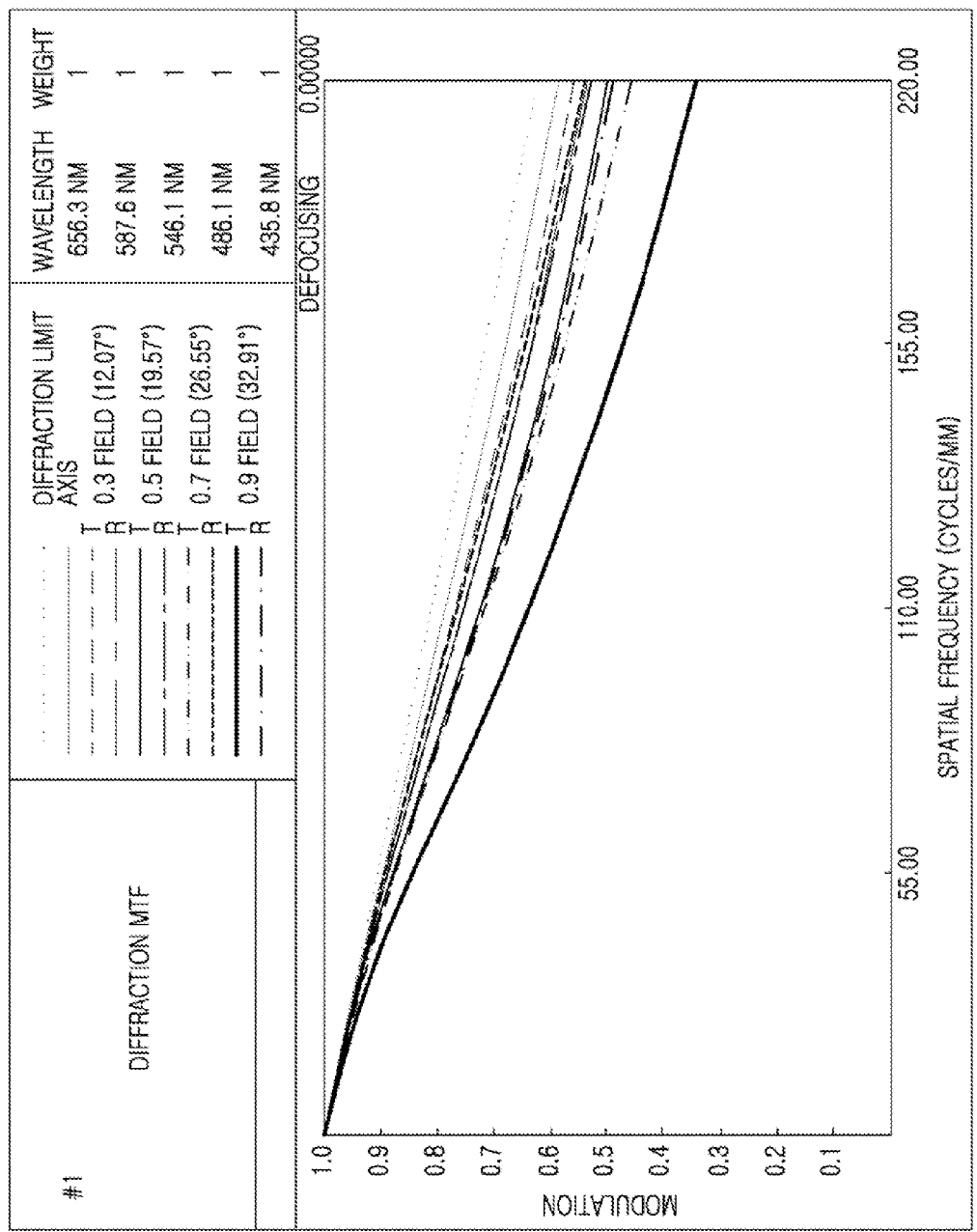
Figure 6:
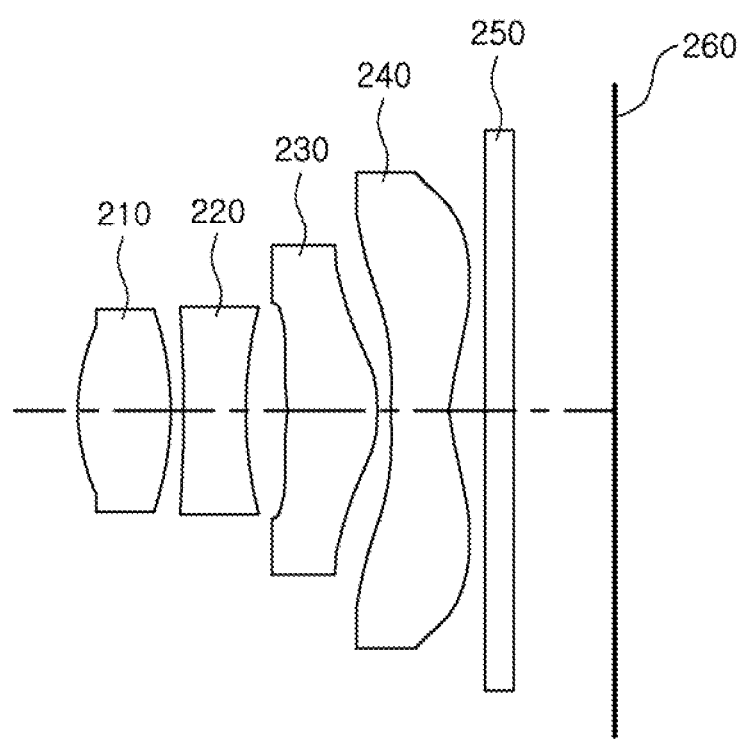
FIG. 6 is a configuration diagram of an optical system according to a second exemplary embodiment of the present disclosure.

In addition, the optical system configured as described above may have aberration characteristics shown in FIGS. 2 and 3.

An optical system according to a second exemplary embodiment of the present disclosure will be described with reference to FIGS. 6 through 10.

The optical system according to a second exemplary embodiment of the present disclosure may include a first lens 210, a second lens 220, a third lens 230, and a fourth lens 240, and may further include an optical filter 250 and an image sensor 260.

Here, as shown in Table 2, a distance (OAL) from an object-side surface of the first lens 210 to a first surface (imaging surface) of the image sensor 260 may be 2.105 mm, and a distance (BFL) from an image-side surface of the fourth lens 240 to an imaging surface may be 0.63056 mm.

In addition, a focal length (f1) of the first lens 210 may be 1.3138 mm, a focal length (f2) of the second lens 220 may be −2.66549 mm, a focal length (f3) of the third lens 230 may be 0.95488 mm, a focal length (f4) of the fourth lens 240 may be −0.83729 mm, and an overall focal length (f) of the optical system may be 1.705 mm.

TABLE 2

| | |
|---|---|
| f | 1.705 |
| f1 | 1.3138 |
| f2 | −2.66549 |
| f3 | 0.95488 |
| f4 | −0.83729 |
| v1 | 56.11378 |
| v2 | 23.27531 |
| v3 | 56.11378 |
| v4 | 56.11378 |
| OAL | 2.105 |
| BFL | 0.63056 |

Here, lens characteristics (radii of curvature, thicknesses of lenses or distances between the lenses, refractive indices, and Abbe numbers) of each lens are shown in FIG. 9.

In a second exemplary embodiment of the present disclosure, the first lens 210 may have positive refractive power and have both surfaces that are convex. The second lens 220 may have negative refractive power and have both surfaces that are concave. The third lens 230 may have positive refractive power and have a meniscus shape in which it is convex toward the image. The fourth lens 240 may have negative refractive power and have both surfaces that are concave. In addition, the fourth lens 240 may have at least one inflection point formed on each of first and second surfaces thereof.

Meanwhile, the respective surfaces of the first to fourth lenses 210 to 240 may have aspherical surface coefficients as shown in FIG. 9. That is, the first to fourth lenses 210 to 240 may have aspherical surfaces, respectively.

Figure 7:
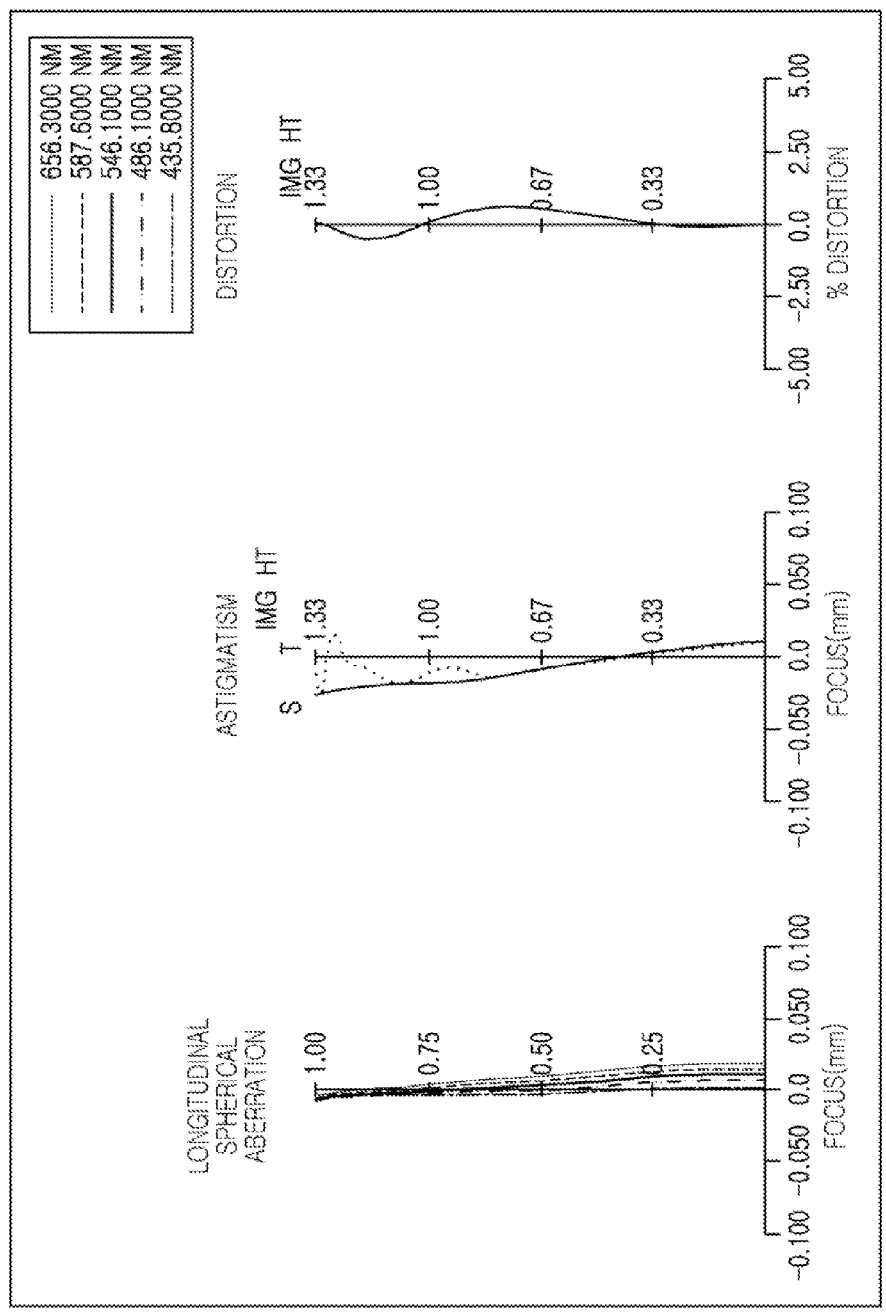
FIGS. 7 and 8 are curves showing aberration characteristics of the optical system shown in FIG. 6.
Figure 8:
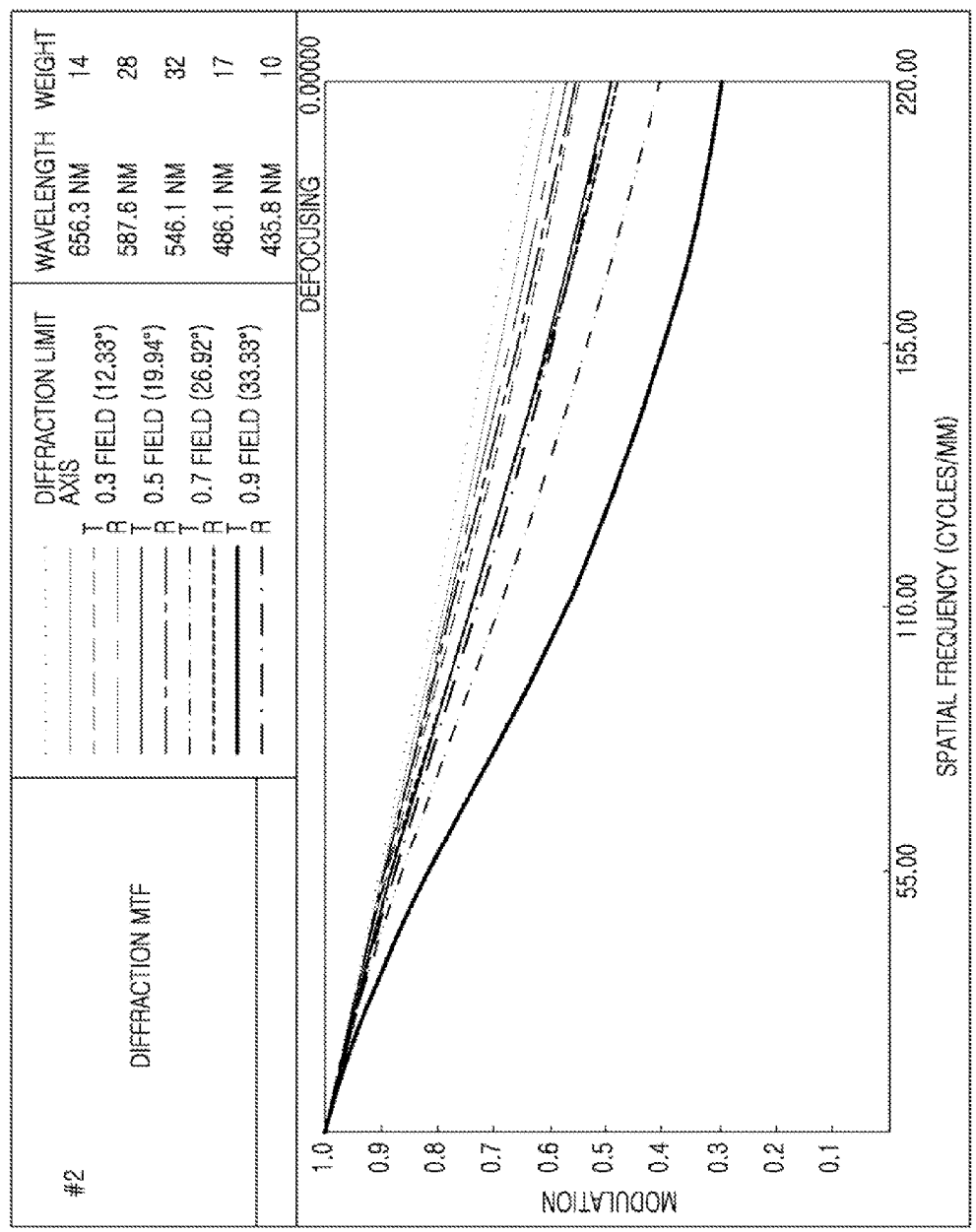
Figure 11:
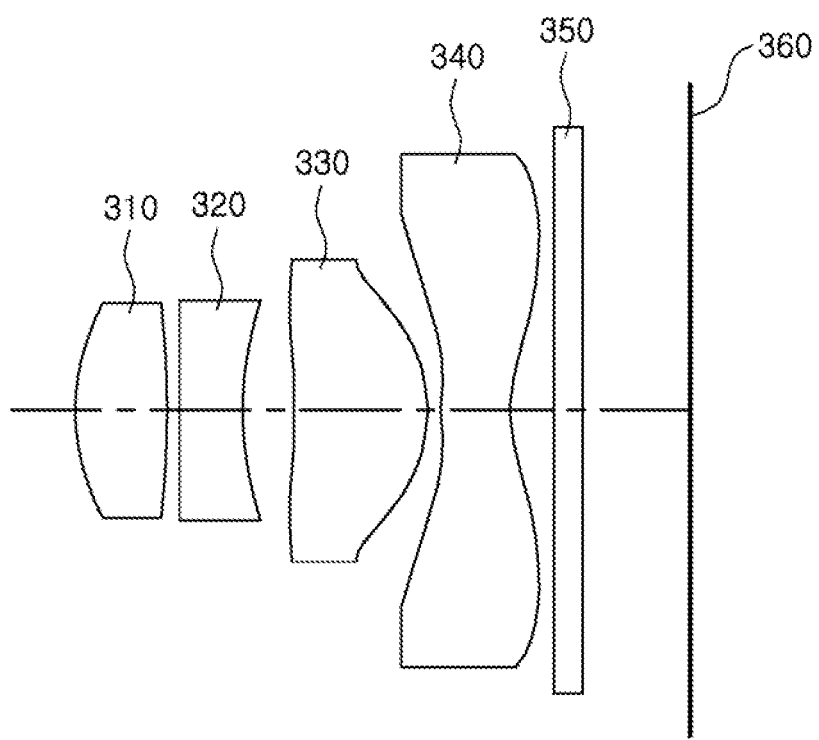
FIG. 11 is a configuration diagram of an optical system according to a third exemplary embodiment of the present disclosure.

In addition, the optical system configured as described above may have aberration characteristics shown in FIGS. 7 and 8.

An optical system according to a third exemplary embodiment of the present disclosure will be described with reference to FIGS. 11 through 15.

The optical system according to a third exemplary embodiment of the present disclosure may include a first lens 310, a second lens 320, a third lens 330, and a fourth lens 340, and may further include an optical filter 350 and an image sensor 360.

Here, as shown in Table 3, a distance (OAL) from an object-side surface of the first lens 310 to a first surface (imaging surface) of the image sensor 360 may be 2.29706 mm, and a distance (BFL) from an image-side surface of the fourth lens 340 to an imaging surface may be 0.66418 mm.

In addition, a focal length (f1) of the first lens 310 may be 1.4083 mm, a focal length (f2) of the second lens 320 may be −2.22256 mm, a focal length (f3) of the third lens 330 may be 0.83721 mm, a focal length (f4) of the fourth lens 340 may be −0.8535 mm, and an overall focal length (f) of the optical system may be 1.705 mm.

TABLE 3

| f | 1.705 |
|---|---|
| f1 | 1.4083 |
| f2 | −2.22256 |
| f3 | 0.83721 |
| f4 | −0.8535 |
| v1 | 56.11378 |
| v2 | 23.27531 |
| v3 | 56.11378 |
| v4 | 56.11378 |
| OAL | 2.29706 |
| BFL | 0.66418 |

Here, lens characteristics (radii of curvature, thicknesses of lenses or distances between the lenses, refractive indices, and Abbe numbers) of each lens are shown in FIG. 14.

In a third exemplary embodiment of the present disclosure, the first lens 310 may have positive refractive power and have both surfaces that are convex. The second lens 320 may have negative refractive power and have both surfaces that are concave. The third lens 330 may have positive refractive power and have a meniscus shape in which it is convex toward the image. The fourth lens 340 may have negative refractive power and have both surfaces that are concave. In addition, the fourth lens 340 may have at least one inflection point formed on each of first and second surfaces thereof.

Meanwhile, the respective surfaces of the first to fourth lenses 310 to 340 may have aspherical surface coefficients as shown in FIG. 15. That is, the first to fourth lenses 310 to 340 may have aspherical surfaces, respectively.

Figure 12:
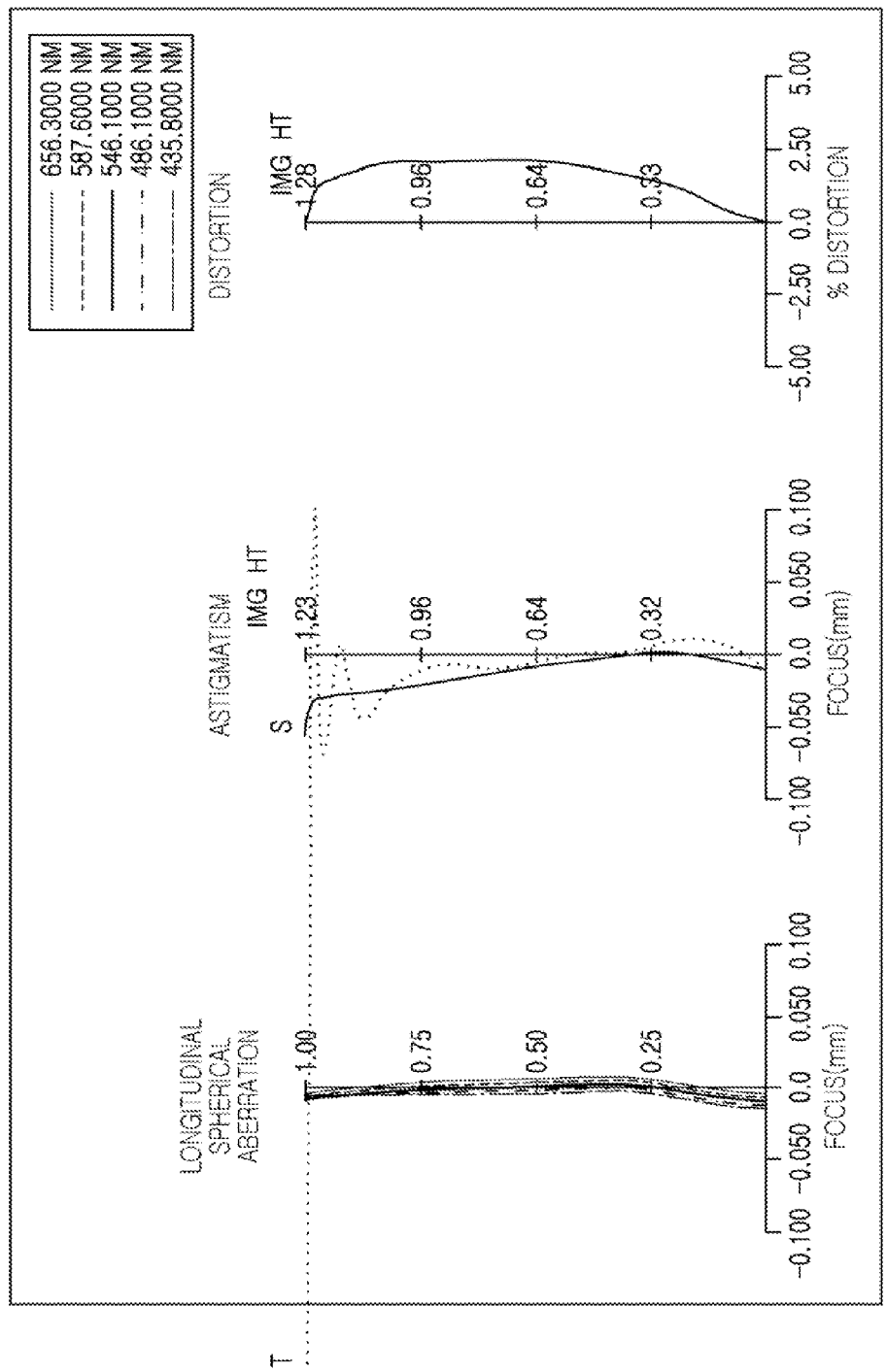
FIGS. 12 and 13 are curves showing aberration characteristics of the optical system shown in FIG. 11.
Figure 13:
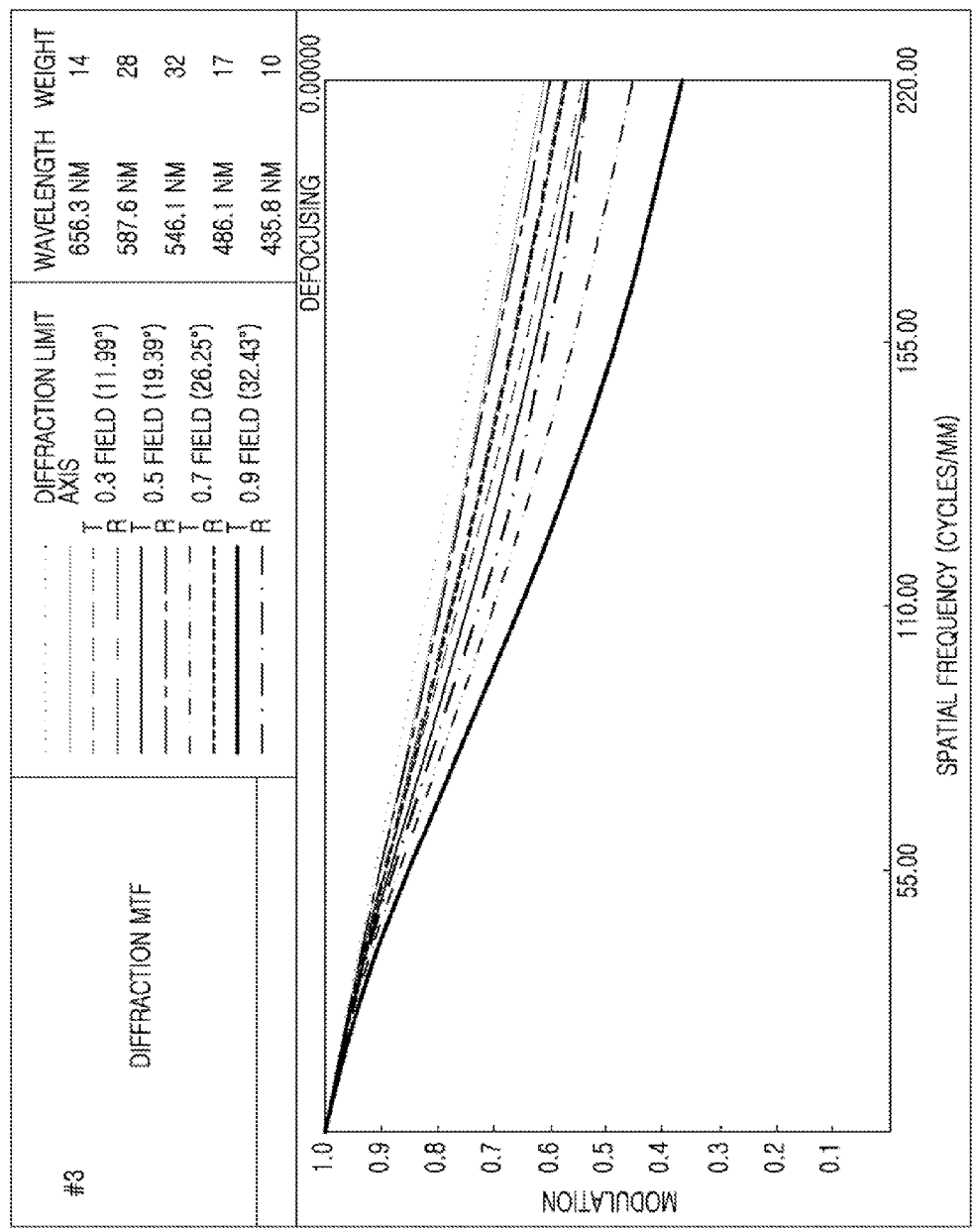
Figure 16:
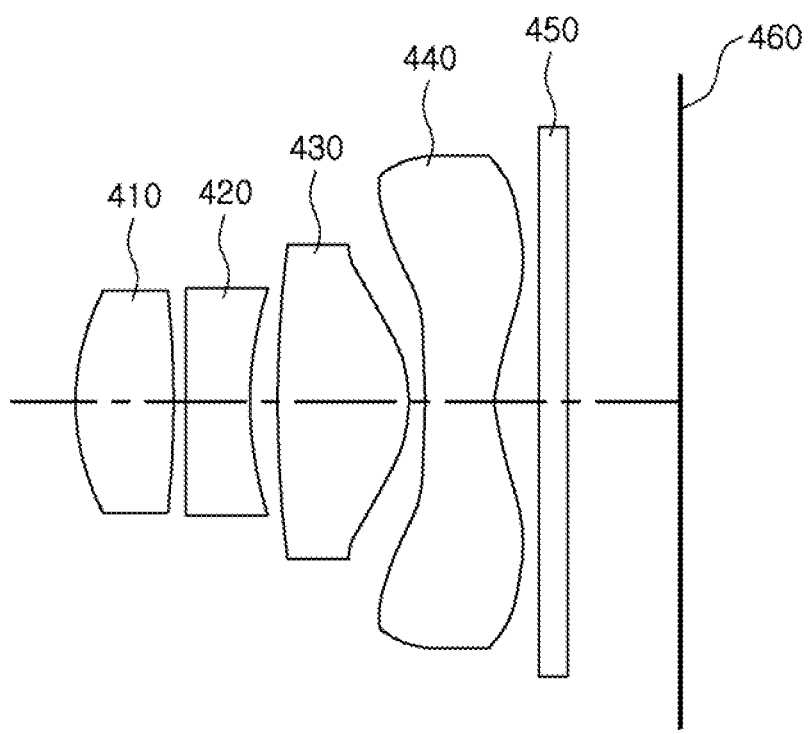
FIG. 16 is a configuration diagram of an optical system according to a fourth exemplary embodiment of the present disclosure.

In addition, the optical system configured as described above may have aberration characteristics shown in FIGS. 12 and 13.

An optical system according to a fourth exemplary embodiment of the present disclosure will be described with reference to FIGS. 16 through 20.

The optical system according to a fourth exemplary embodiment of the present disclosure may include a first lens 410, a second lens 420, a third lens 430, and a fourth lens 440, and may further include an optical filter 450 and an image sensor 460.

Here, as shown in Table 4, a distance (OAL) from an object-side surface of the first lens 410 to a first surface (imaging surface) of the image sensor 460 may be 2.19084 mm, and a distance (BFL) from an image-side surface of the fourth lens 440 to an imaging surface may be 0.65705 mm.

In addition, a focal length (f1) of the first lens 410 may be 1.44163 mm, a focal length (f2) of the second lens 420 may be −2.35558 mm, a focal length (f3) of the third lens 430 may be 0.82773 mm, a focal length (f4) of the fourth lens 440 may be −0.8554 mm, and an overall focal length (f) of the optical system may be 1.61001 mm.

TABLE 4

| f | 1.61001 |
|---|---|
| f1 | 1.44163 |
| f2 | −2.35558 |
| f3 | 0.82773 |
| f4 | −0.8554 |
| v1 | 56.11378 |
| v2 | 23.27531 |
| v3 | 56.11378 |
| v4 | 56.11378 |
| OAL | 2.19084 |
| BFL | 0.65705 |

Here, lens characteristics (radii of curvature, thicknesses of lenses or distances between the lenses, refractive indices, and Abbe numbers) of each lens are shown in FIG. 19.

In a fourth exemplary embodiment of the present disclosure, the first lens 410 may have positive refractive power and have both surfaces that are convex. The second lens 420 may have negative refractive power and have both surfaces that are concave. The third lens 430 may have positive refractive power and have a meniscus shape in which it is convex toward the image. The fourth lens 440 may have negative refractive power and have both surfaces that are concave. In addition, the fourth lens 440 may have at least one inflection point formed on each of first and second surfaces thereof.

Meanwhile, the respective surfaces of the first to fourth lenses 410 to 440 may have aspherical surface coefficients as shown in FIG. 20. That is, the first to fourth lenses 410 to 440 may have aspherical surfaces, respectively.

Figure 17:
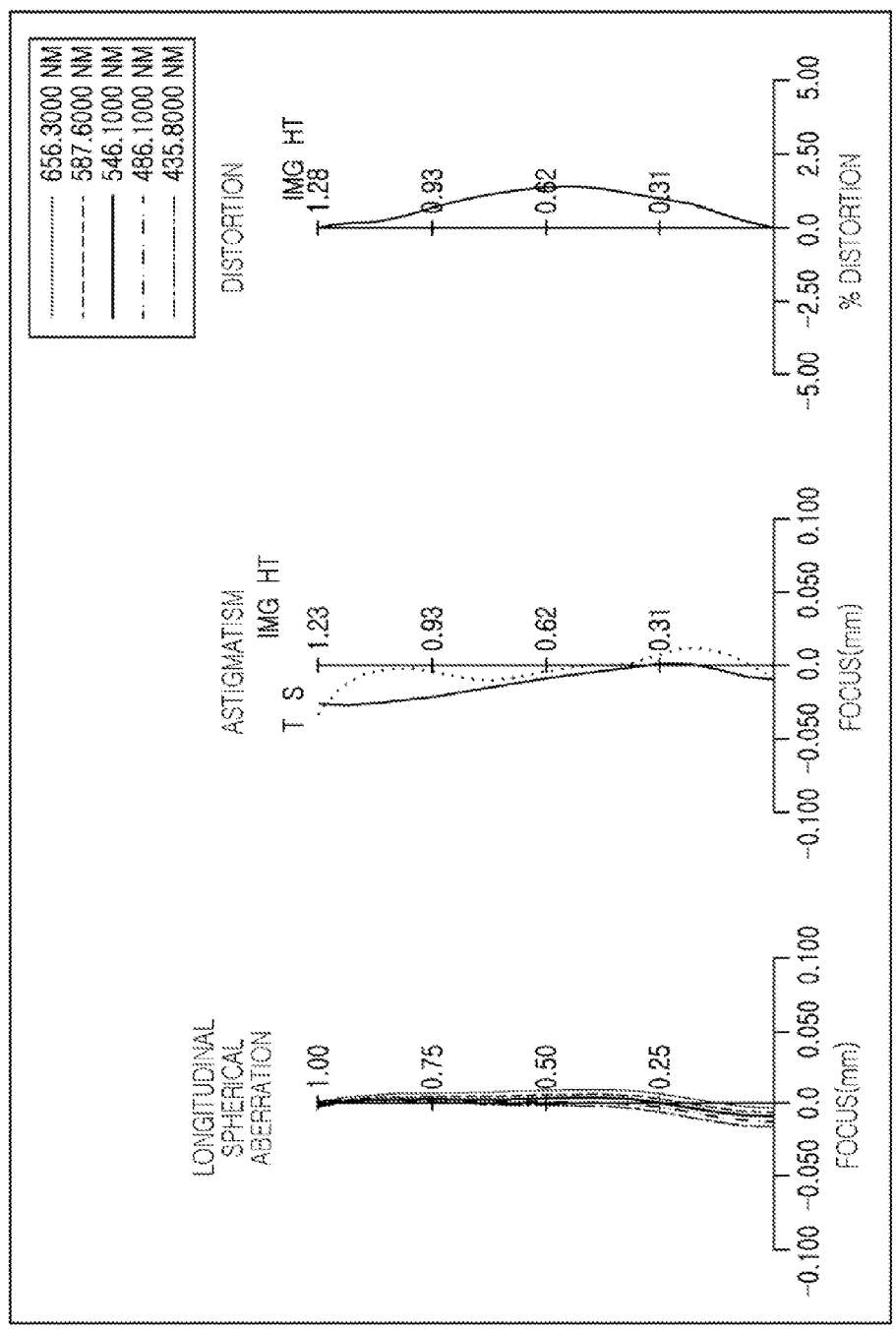
FIGS. 17 and 18 are curves showing aberration characteristics of the optical system shown in FIG. 16.
Figure 18:
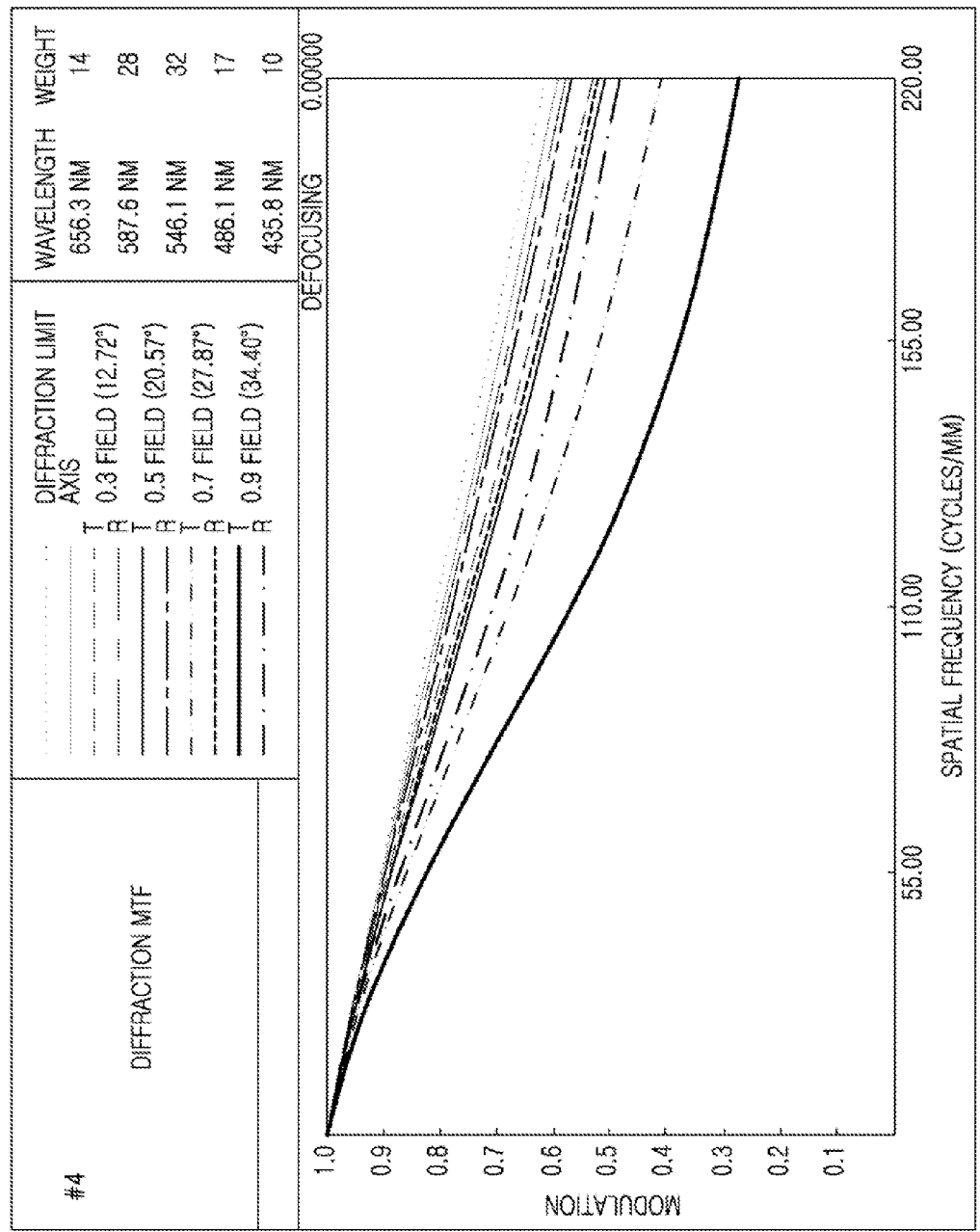
Figure 21:
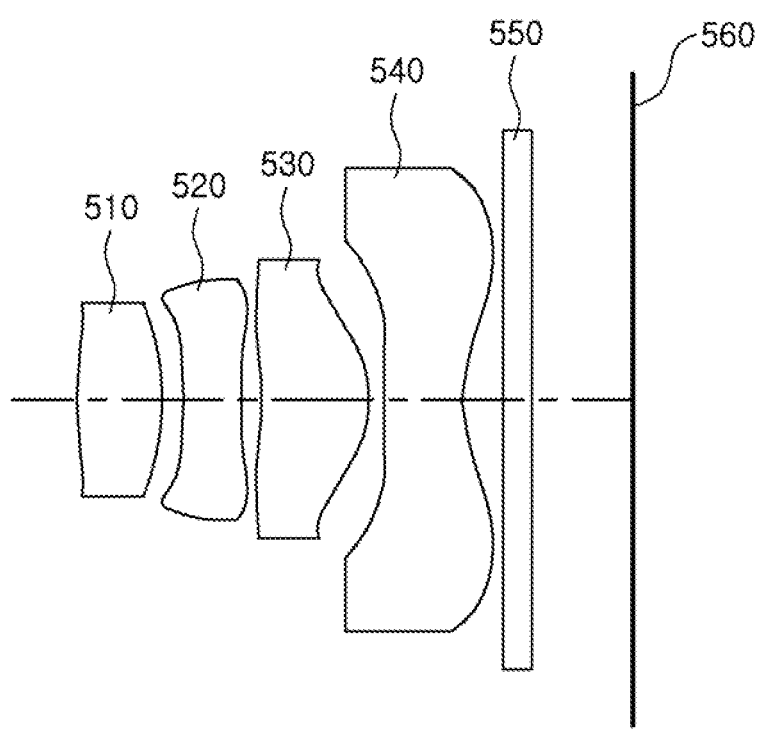
FIG. 21 is a configuration diagram of an optical system according to a fifth exemplary embodiment of the present disclosure.

In addition, the optical system configured as described above may have aberration characteristics shown in FIGS. 17 and 18.

An optical system according to a fifth exemplary embodiment of the present disclosure will be described with reference to FIGS. 21 through 25.

The optical system according to a fifth exemplary embodiment of the present disclosure may include a first lens 510, a second lens 520, a third lens 530, and a fourth lens 540, and may further include an optical filter 550 and an image sensor 560.

Here, as shown in Table 5, a distance (OAL) from an object-side surface of the first lens 510 to a first surface (imaging surface) of the image sensor 560 may be 2.64996 mm, and a distance (BFL) from an image-side surface of the fourth lens 540 to an imaging surface may be 0.66438 mm.

In addition, a focal length (f1) of the first lens 510 may be 1.57008 mm, a focal length (f2) of the second lens 520 may be −2.453 mm, a focal length (f3) of the third lens 530 may be 0.87332 mm, a focal length (f4) of the fourth lens 540 may be −1.03785 mm, and an overall focal length (f) of the optical system may be 1.47995 mm.

TABLE 5

| | |
|---|---|
| f | 1.47995 |
| f1 | 1.57008 |
| f2 | −2.453 |
| f3 | 0.87332 |
| f4 | −1.03785 |
| v1 | 56.11378 |
| v2 | 23.27531 |
| v3 | 56.11378 |
| v4 | 56.11378 |
| OAL | 2.64996 |
| BFL | 0.66438 |

Here, lens characteristics (radii of curvature, thicknesses of lenses or distances between the lenses, refractive indices, and Abbe numbers) of each lens are shown in FIG. 24.

In a fifth exemplary embodiment of the present disclosure, the first lens 510 may have positive refractive power and have both surfaces that are convex. The second lens 520 may have negative refractive power and have both surfaces that are concave. The third lens 530 may have positive refractive power and have a meniscus shape in which it is convex toward the image. The fourth lens 540 may have negative refractive power and have a meniscus shape in which it is convex toward the object. In addition, the fourth lens 540 may have at least one inflection point formed on first and second surfaces thereof.

Meanwhile, the respective surfaces of the first to fourth lenses 510 to 540 may have aspherical surface coefficients as shown in FIG. 25. That is, the first to fourth lenses 510 to 540 may have aspherical surfaces, respectively.

Figure 22:
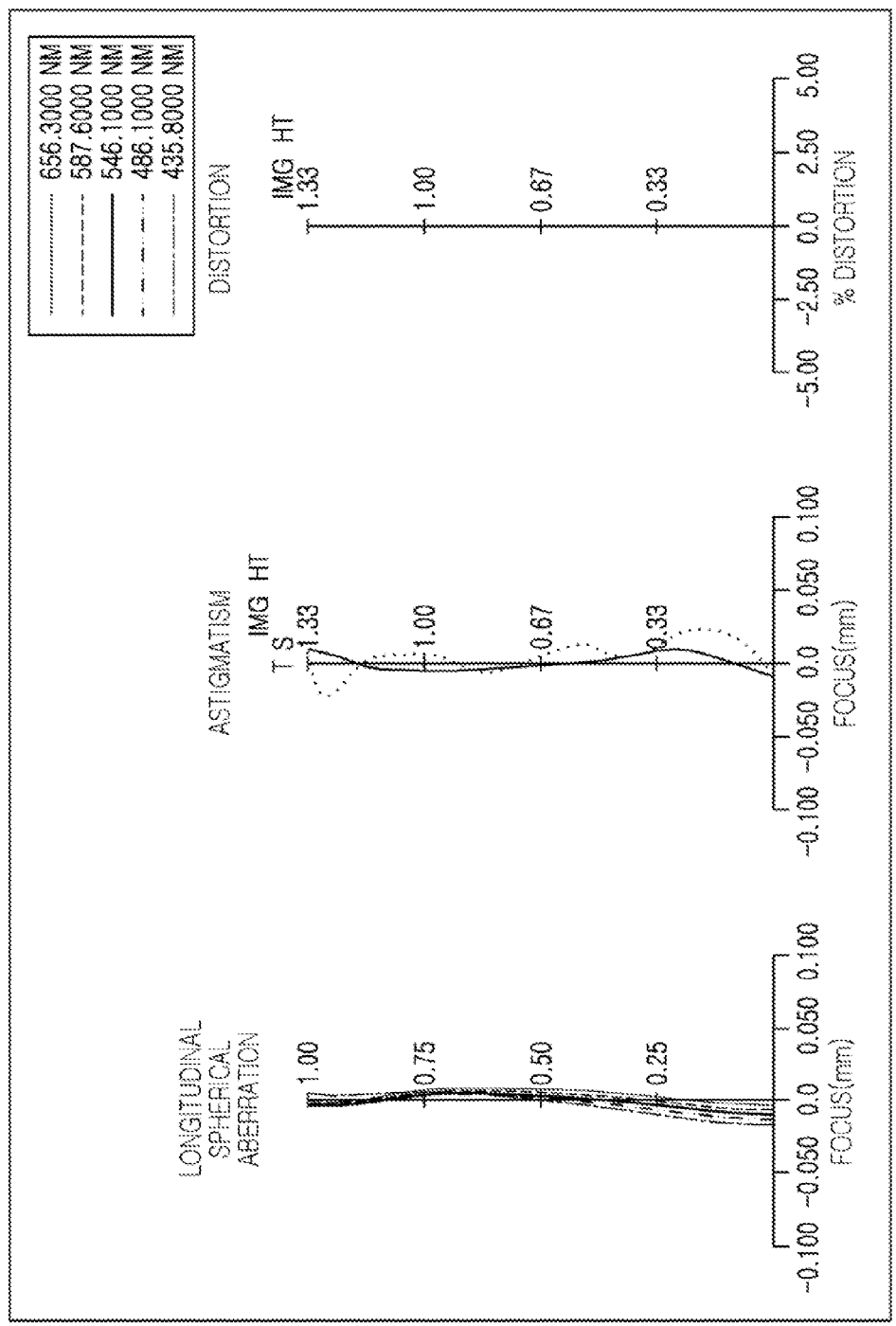
FIGS. 22 and 23 are curves showing aberration characteristics of the optical system shown in FIG. 21.
Figure 23:
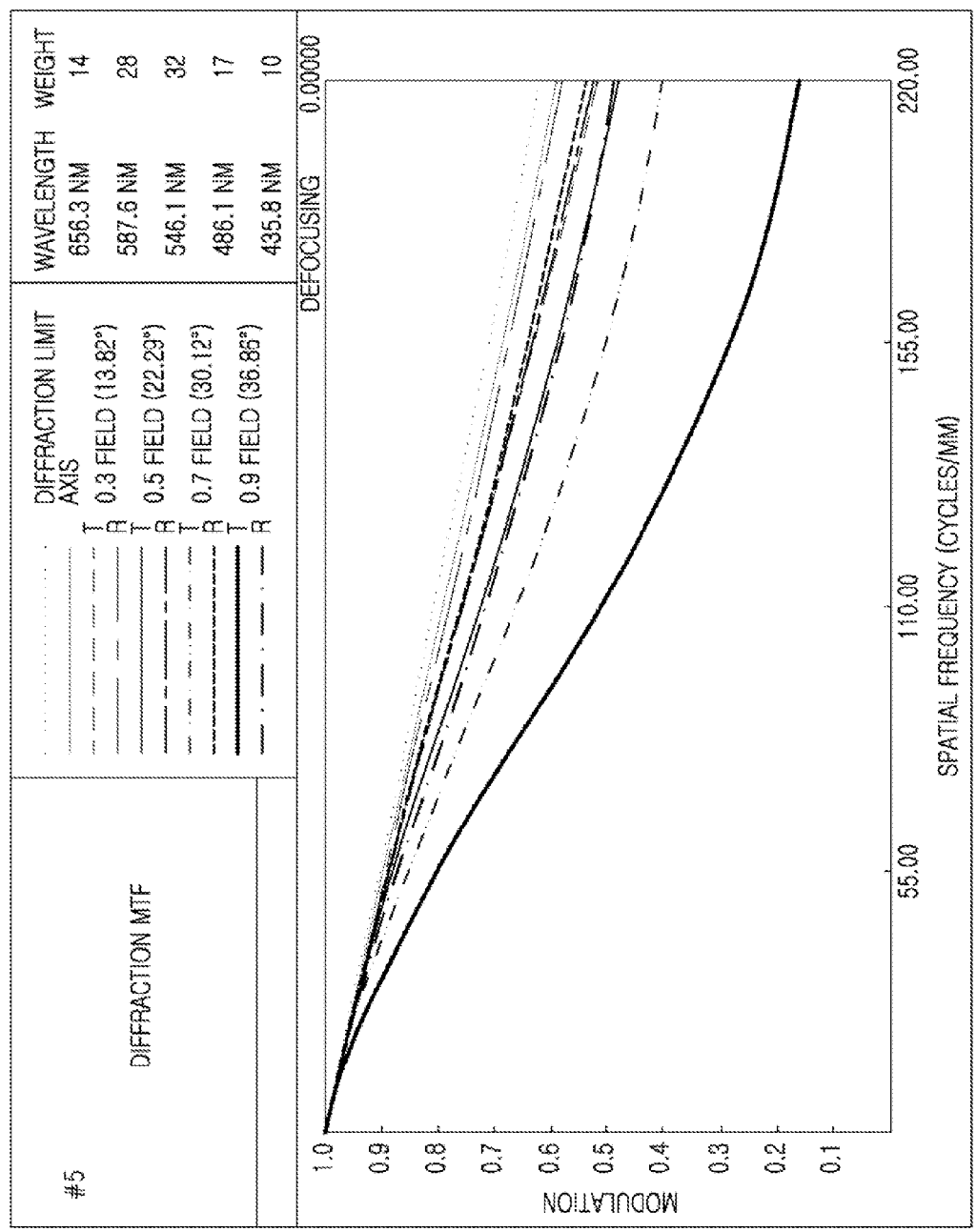

In addition, the optical system configured as described above may have aberration characteristics shown in FIGS. 22 and 23.

TABLE 6

| Conditional Expression | First Exemplary Embodiment | Second Exemplary Embodiment | Third Exemplary Embodiment | Fourth Exemplary Embodiment | Fifth Exemplary Embodiment |
|---|---|---|---|---|---|
| f12/f | 1.575 | 1.186 | 1.535 | 1.612 | 2.080 |
| TTL/D2 | 10.223 | 9.356 | 10.209 | 9.737 | 11.778 |
| BFL/f | 0.396 | 0.370 | 0.390 | 0.408 | 0.449 |
| R1/f | 0.511 | 0.501 | 0.501 | 0.531 | 0.775 |
| V1 − V2 | 32.838 | 32.838 | 32.838 | 32.838 | 32.838 |
| R6 − R7/ R6 + R7 | 0.780 | 0.673 | 0.774 | 0.793 | 0.688 |
| f/ImgH | 1.382 | 1.382 | 1.382 | 1.305 | 1.199 |

Meanwhile, it may be appreciated from Table 6 that the optical systems according to first and fifth exemplary embodiments of the present disclosure satisfy Conditional Expressions 1 to 7 described above. Therefore, the aberration improvement effect may be increased, the high resolution may be implemented, the sensitivity of the lenses may be improved, and the demand for the miniaturization may be satisfied.

As set forth above, according to exemplary embodiments of the present disclosure, the aberration improvement effect may be increased, the high resolution may be implemented, the sensitivity of the lenses may be improved, and the demand for the miniaturization may be satisfied.

While exemplary embodiments have been shown and described above, it will be apparent to those skilled in the art that modifications and variations could be made without departing from the scope of the present invention as defined by the appended claims.

What is claimed is:

1. An optical system comprising:
   a first lens having positive refractive power of which both surfaces are convex;
   a second lens having negative refractive power;
   a third lens having positive refractive power;
   a fourth lens having negative refractive power; and
   an optical filter formed of a plastic material and configured to cut off an infrared ray,
   wherein the first to fourth lenses and the optical filter are sequentially disposed from an object side, and
   wherein an Abbe number of the optical filter is less than 60.

2. The optical system of claim 1, wherein both surfaces of the second lens are concave.

3. The optical system of claim 1, wherein the third lens has a meniscus shape of which an image-side surface is convex.

4. The optical system of claim 1, wherein both surfaces of the fourth lens are concave.

5. The optical system of claim 1, wherein the fourth lens has a meniscus shape of which an object-side surface is convex.

6. The optical system of claim 1, further comprising an image sensor converting an image of a subject incident through the first to fourth lenses into an electrical signal, wherein Conditional Expression 1 is satisfied:

$$BFL/f<0.4 \qquad \text{[Conditional Expression 1]}$$

where BFL is a distance from an image-side surface of the fourth lens to an imaging surface of the image sensor, and f is an overall focal length of the optical system.

7. The optical system of claim 1, further comprising an image sensor converting an image of a subject incident through the first to fourth lenses into an electrical signal, wherein Conditional Expression 2 is satisfied:

$$TTL/D2>9.3 \qquad \text{[Conditional Expression 2]}$$

where TTL is a distance from an object-side surface of the first lens to an imaging surface of the image sensor, and D2 is a thickness of the second lens in a paraxial region.

8. The optical system of claim 1, wherein Conditional Expression 3 is satisfied:

$$1.1<f12/f<2.1 \qquad \text{[Conditional Expression 3]}$$

where f12 is a synthetic focal length of the first and second lenses, and f is an overall focal length of the optical system.

9. The optical system of claim 1, wherein Conditional Expression 4 is satisfied:

$R1/f>0.5$ [Conditional Expression 4]

where R1 is a radius of curvature of an object-side surface of the first lens, and f is an overall focal length of the optical system.

10. The optical system of claim 1, wherein Conditional Expression 5 is satisfied:

$V1-V2>30$ [Conditional Expression 5]

where V1 is an Abbe number of the first lens, and V2 is an Abbe number of the second lens.

11. The optical system of claim 1, wherein Conditional Expression 6 is satisfied:

$0.65<(R6-R7)/(R6+R7)<0.85$ [Conditional Expression 6]

where R6 is a radius of curvature of an object-side surface of the third lens, and R7 is a radius of curvature of an image-side surface of the third lens.

12. The optical system of claim 1, further comprising an image sensor converting an image of a subject incident through the first to fourth lenses into an electrical signal, wherein Conditional Expression 7 is satisfied:

$f/ImgH<1.4$ [Conditional Expression 7]

where f is an overall focal length of the optical system, and ImgH is a diagonal length of an imaging surface of the image sensor.

13. The optical system of claim 1, wherein the first to fourth lenses are plastic lenses.

14. The optical system of claim 1, wherein the fourth lens has at least one inflection point formed on an object-side surface thereof.

15. The optical system of claim 1, wherein the fourth lens has at least one inflection point formed on an image-side surface thereof.

16. An optical system comprising:
a first lens having positive refractive power, of which both surfaces are convex;
a second lens having negative refractive power, of which both surfaces are concave;
a third lens having positive refractive power and a concave object-side surface;
a fourth lens having negative refractive power; and
an image sensor converting an image of a subject incident through the first to fourth lenses into an electrical signal,
wherein the first to fourth lenses and the image sensor are sequentially disposed from an object side, and
Conditional Expression 1 is satisfied:

$BFL/f<0.4$ [Conditional Expression 1]

where BFL is a distance from an image-side surface of the fourth lens to an imaging surface of the image sensor, and f is an overall focal length of the optical system.

17. The optical system of claim 16, wherein Conditional Expression 2 is satisfied:

$TTL/D2>9.3$ [Conditional Expression 2]

where TTL is a distance from an object-side surface of the first lens to the imaging surface of the image sensor, and D2 is a thickness of the second lens in a paraxial region.

18. The optical system of claim 16, wherein Conditional Expression 3 is satisfied:

$1.1<f12/f<2.1$ [Conditional Expression 3]

where f12 is a synthetic focal length of the first and second lenses.

19. The optical system of claim 16, wherein Conditional Expression 4 is satisfied:

$R1/f>0.5$ [Conditional Expression 4]

where R1 is a radius of curvature of an object-side surface of the first lens.

20. The optical system of claim 16, wherein Conditional Expression 5 is satisfied:

$V1-V2>30$ [Conditional Expression 5]

where V1 is an Abbe number of the first lens, and V2 is an Abbe number of the second lens.

21. The optical system of claim 16, wherein Conditional Expression 6 is satisfied:

$0.65<(R6-R7)/(R6+R7)<0.85$ [Conditional Expression 6]

where R6 is a radius of curvature of an object-side surface of the third lens, and R7 is a radius of curvature of an image-side surface of the third lens.

22. The optical system of claim 16, wherein Conditional Expression 7 is satisfied:

$f/ImgH<1.4$ [Conditional Expression 7]

where ImgH is a diagonal length of the imaging surface of the image sensor.

23. The optical system of claim 16, further comprising an optical filter transmitting external light incident through the first to fourth lenses therethrough and formed of a plastic material,
wherein an Abbe number of the optical filter is less than 60.

24. The optical system of claim 16, wherein the fourth lens has at least one inflection point formed on each of an object-side surface and the image-side surface thereof.

25. The optical system of claim 16, wherein both surfaces of the fourth lens are concave.

26. The optical system of claim 16, wherein the fourth lens has a meniscus shape of which an object-side surface is convex.

* * * * *